United States Patent
Krainer et al.

(10) Patent No.: US 11,014,533 B2
(45) Date of Patent: May 25, 2021

(54) PLATFORM FOR AUTOMOTIVE PERSONALIZATION

(71) Applicant: Byton Limited, Hong Kong (HK)

(72) Inventors: Gerald Krainer, Mountain View, CA (US); Jean Loubinoux, Sai Ying Pun (HK); Martin Schoell, Munich (DE); Marco Hoeglinger, Munich (DE)

( * ) Notice: Subject to any disclaimer, the term of this patent is extended or adjusted under 35 U.S.C. 154(b) by 0 days.

(21) Appl. No.: 15/863,847

(22) Filed: Jan. 5, 2018

(65) Prior Publication Data

US 2019/0210559 A1    Jul. 11, 2019

(51) Int. Cl.

| | |
|---|---|
| *B60R 25/20* | (2013.01) |
| *G06F 9/445* | (2018.01) |
| *G06F 9/451* | (2018.01) |
| *H04W 4/44* | (2018.01) |
| *B60W 50/08* | (2020.01) |
| *H04L 29/08* | (2006.01) |
| *B60W 50/00* | (2006.01) |
| *H04W 4/38* | (2018.01) |

(Continued)

(52) U.S. Cl.
CPC ......... *B60R 25/2081* (2013.01); *B60W 50/08* (2013.01); *G06F 9/44505* (2013.01); *G06F 9/452* (2018.02); *H04L 67/306* (2013.01); *H04W 4/44* (2018.02); *B60W 2050/0064* (2013.01)

(58) Field of Classification Search
CPC ..... B60R 25/2081; H04W 4/44; B60W 50/08; B60W 2050/0064; H04L 67/306
USPC ...................................................... 701/24
See application file for complete search history.

(56) References Cited

U.S. PATENT DOCUMENTS

| | | |
|---|---|---|
| 8,725,527 B1 | 5/2014 | Kahn et al. |
| 10,238,346 B2 | 3/2019 | Newberry |

(Continued)

FOREIGN PATENT DOCUMENTS

| | | |
|---|---|---|
| CN | 104598269 A | 5/2015 |
| CN | 105235615 A | 1/2016 |

(Continued)

OTHER PUBLICATIONS

The First Chinese Office Action for Chinese Application No. 201811325990.0 dated Mar. 3, 2020, 12 pages.

(Continued)

*Primary Examiner* — Marthe Y Marc-Coleman
(74) *Attorney, Agent, or Firm* — Womble Bond Dickinson (US) LLP

(57) ABSTRACT

Embodiments of a system include a cloud computing center with one or more servers, storage coupled to the one or more servers, and a communication interface coupled to the one or more servers. A plurality of devices are communicatively coupled to the communication interface of the cloud computing center, so that the plurality of devices can communicate with the cloud computing center and with each other via the cloud computing center. At least one of the plurality of devices is a vehicle. A plurality of functional modules include instructions that, when executed by the cloud computing center, by at least one the plurality of devices, or by both the cloud computing center and at least one of the plurality of devices, enable functions including remote or direct interaction with the vehicle and, when there is direct interaction, personalization of the vehicle.

45 Claims, 14 Drawing Sheets

(51) Int. Cl.
*H04W 4/40* (2018.01)
*B60R 16/023* (2006.01)

(56) References Cited

U.S. PATENT DOCUMENTS

| | | |
|---|---|---|
| 2013/0012788 A1 | 1/2013 | Horseman |
| 2013/0231582 A1 | 9/2013 | Prasad |
| 2014/0309806 A1 | 10/2014 | Ricci |
| 2014/0309870 A1* | 10/2014 | Ricci ................... H04W 4/21 701/36 |
| 2014/0309873 A1 | 10/2014 | Ricci |
| 2014/0353048 A1 | 12/2014 | Kriger |
| 2015/0088337 A1 | 3/2015 | Toohy et al. |
| 2015/0210287 A1* | 7/2015 | Penilla ................. B60W 40/08 701/49 |
| 2015/0366471 A1 | 12/2015 | Leboeuf et al. |
| 2016/0104486 A1* | 4/2016 | Penilla ................. H04L 67/12 704/232 |
| 2016/0107646 A1 | 4/2016 | Kolisetty et al. |
| 2016/0152180 A1 | 6/2016 | Kirsch et al. |
| 2017/0105104 A1 | 4/2017 | Ulmansky et al. |
| 2017/0155998 A1 | 6/2017 | Boesen |
| 2017/0158023 A1 | 6/2017 | Stevanovic et al. |
| 2017/0300628 A1 | 10/2017 | Laing et al. |
| 2019/0263424 A1* | 8/2019 | Penilla ................. H04L 63/107 |

FOREIGN PATENT DOCUMENTS

| | | |
|---|---|---|
| CN | 105774708 A | 7/2016 |
| CN | 105774709 A | 7/2016 |
| CN | 105946750 A | 9/2016 |
| CN | 107107749 A | 8/2017 |
| CN | 107440685 A | 12/2017 |
| CN | 107878370 A | 4/2018 |
| WO | 2015138416 A1 | 9/2015 |

OTHER PUBLICATIONS

The International Preliminary Report on Patentability for PCT Application No. PCT/US2018/058592 dated Jul. 7, 2020, 8 pages.
The International Search Report for PCT Application No. PCT/US2018/058592 dated Feb. 1, 2019, 3 pages.
The Written Opinion of the International Searching Authority for PCT Application No. PCT/US2018/058592 dated Feb. 1, 2019, 7 pages.
The First Chinese Office Action for Chinese Application No. 201811325984.5 dated Dec. 25, 2019, 22 pages.
The International Preliminary Report on Patentability for the PCT Application No. PCT/US2018/053209 dated Jul. 7, 2020, 7 pages.
The International Search Report for PCT Application No. PCT/US2018/053209 dated Dec. 14, 2018, 5 pages.
The Written Opinion of the International Searching Authority for PCT Application No. PCT/US2018/053209 dated Dec. 14, 2018, 6 pages.
The International Search Report for PCT Application No. PCT/CN2020/070332 dated Apr. 7, 2020, 4 pages.
The Written Opinion of the International Searching Authority for PCT Application No. PCT/CN2020/070332 dated Apr. 7, 2020, 4 pages.

* cited by examiner

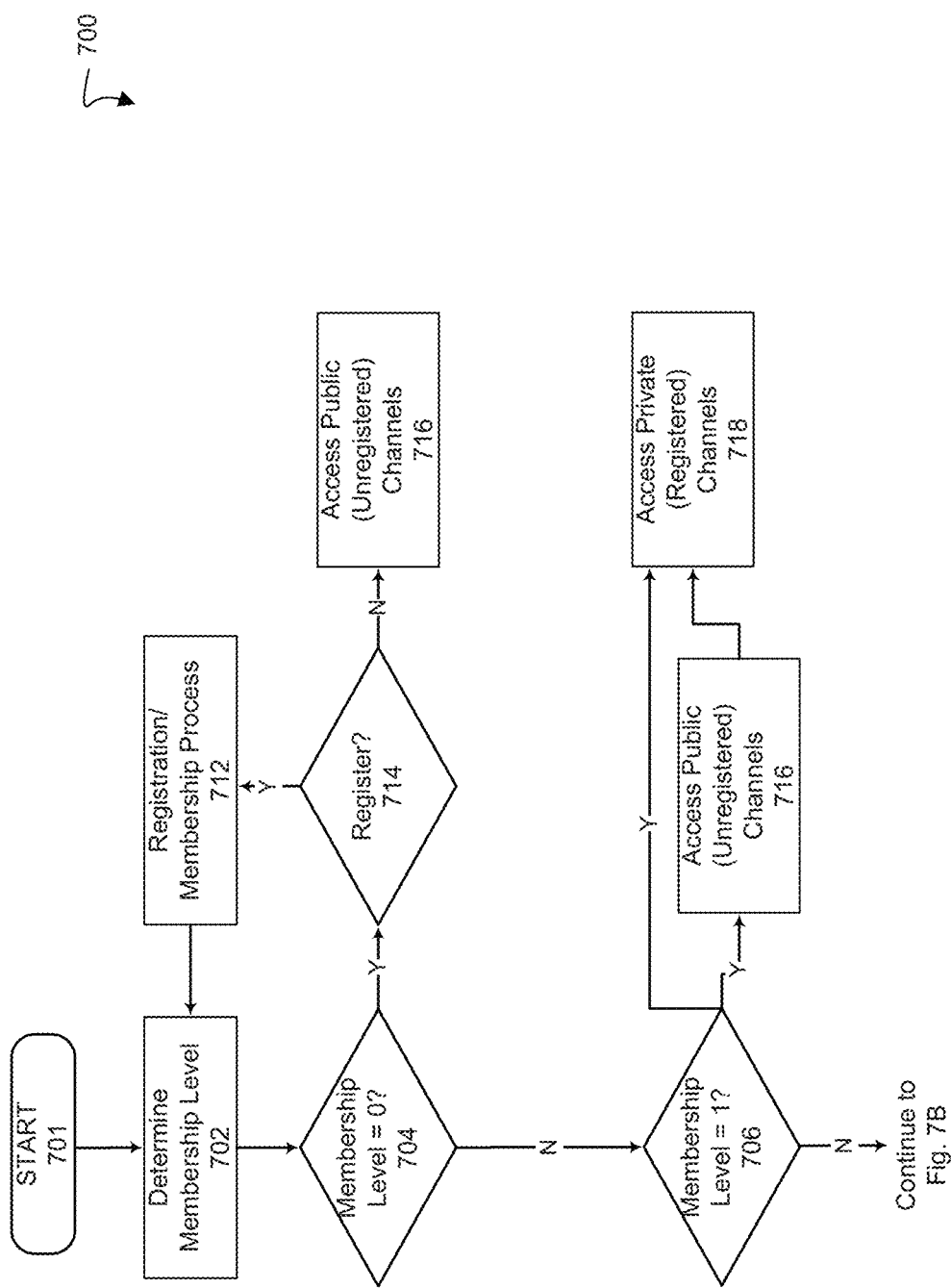

PLATFORM FOR AUTOMOTIVE PERSONALIZATION

TECHNICAL FIELD

The disclosed embodiments relate generally to computing platforms and in particular, but not exclusively, to a platform for automotive personalization.

BACKGROUND

An average person usually has several electronic devices such as a smartwatch and cell phone. But despite their enormous benefits, one problem with devices is that the presentation can be unsuitable in certain circumstances. When driving a car, for instance, it is difficult to use a smart-watch or smartphone, because they can create distraction and, moreover, the displays can be small and hard to see. Passengers don't have the distraction, but still must deal with small displays. In addition, in many cases the devices don't easily cooperate with each other, making it difficult to seamlessly switch from one device to another. A platform that allows seamless interaction among devices, including a car, as well as customization and personalization of the devices, would be very useful.

SUMMARY

Embodiments of a system include a cloud computing center with one or more servers, storage coupled to the one or more servers, and a communication interface coupled to the one or more servers. A plurality of devices are communicatively coupled to the communication interface of the cloud computing center, so that the plurality of devices can communicate with the cloud computing center and with each other via the cloud computing center. At least one of the plurality of devices is a vehicle. A plurality of functional modules include instructions that, when executed by the cloud computing center, by at least one the plurality of devices, or by both the cloud computing center and at least one of the plurality of devices, enable functions including remote or direct interaction with the vehicle and, when there is direct interaction, personalization of the vehicle.

Embodiments of an apparatus include a vehicle having a computer, the computer including storage and at least one processor. A transceiver is communicatively coupled to the computer to allow the vehicle to communicate with a cloud computing center including one or more servers and storage coupled to the one or more servers and to communicate, via the cloud computing center, with a plurality of devices. A plurality of functional modules including instructions that, when executed by the cloud computing center, by the computer, by at least one of the plurality of devices, or by all three, enable functions including remote or direct interaction with the vehicle and, when there is direct interaction, personalization of the vehicle.

Embodiments of a process include communicatively coupling a plurality of devices to a cloud computing center. The cloud computing center includes one or more servers, storage coupled to the one or more servers, and a communication interface coupled to the one or more servers. The plurality of devices can communicate with the cloud computing center and with each other via the cloud computing center and wherein at least one of the plurality of devices is a vehicle. The process includes executing a plurality of functional modules including instructions that, when executed by the cloud computing center, by at least one the plurality of devices, or by both, enable functions including remote or direct interaction with the vehicle and, when there is direct interaction, personalization of the vehicle.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 7A-7B together are a flowchart of an embodiment of the community module of FIG. 5.

DETAILED DESCRIPTION

Embodiments of an apparatus and method for a platform for automotive personalization are described below. One part of the system is a cloud computing center that includes servers, storage, and databases to collect and store user data. Another part is a plurality of devices that can communicate with the cloud computing center and, through the cloud computing center, with each other. In some cases a subset of the plurality of devices can communicate directly with each other instead of having to communicate through the cloud computing center. One of the plurality of devices that can communicate with the cloud computing center is a vehicle. A set of functional modules allow the plurality of devices to interact with each other, and that interaction can include remote control of some vehicle functions and personalization of the car.

Figure 1:
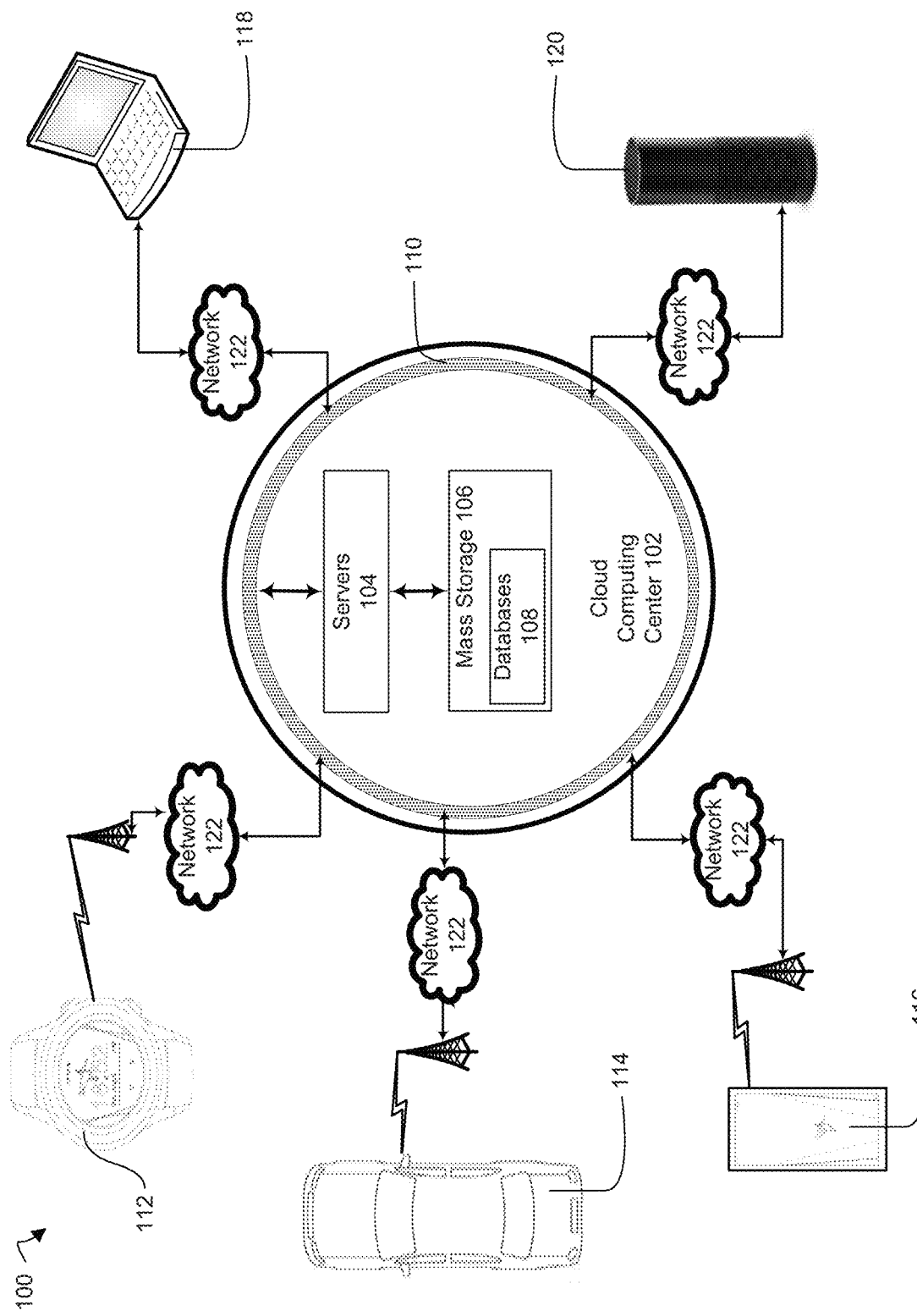
FIG. 1 is a block diagram of an embodiment of a platform for automotive personalization.

FIG. 1 illustrates an embodiment of a platform 100 for automobile personalization and interaction. Platform 100 includes a cloud computing center 102 that is communicatively coupled to a plurality of devices including a smart watch 112, a vehicle 114, a smartphone 116, a laptop or desktop computer 118, and a smart speaker 120. Generally, each user of platform 100 will own at least one of these devices. In the context of this application, that entities or devices are "communicatively coupled" means that they are coupled in such a way that data, commands, or other information can be exchanged, in one or both directions, between the two.

Cloud computing center 102 includes a server 104 coupled to mass storage 106, with one or more databases 108 stored in mass storage 106. Although illustrated as a single server, in other embodiments server 104 can include multiple servers, each of which includes one or more microprocessors, memory, and onboard storage. Computing center 102 also includes a communication interface 110 communicatively coupled to servers 104 and to networks 122, so that cloud computing center 102 can exchange instructions and/or data with devices 112, 114, 116, 118, and 120 through network 122. In one embodiment network 122 is the Internet, but in other embodiments it can be a local area network (LAN), a wide area network (WAN), a combination of these types of networks, or some other type of network entirely.

Smart watch 112, vehicle 114, and smartphone 116, all being mobile devices, are illustrated wirelessly connected to cloud computing center 102 via network 122. In other embodiments, however, each of these devices can be connected to cloud computing center 102 via a temporary or permanent wired connection. In one embodiment, smart watch 112 includes a microprocessor, storage, and communication capabilities such as those found in commercially available smartwatches such as the Apple watch. Similarly, in one embodiment smartphone 116 can be any smartphone including a microprocessor, storage, and the capability to run software; examples include commercially available smartphones made by Apple, Samsung, HTC, and other manufacturers.

Laptop or desktop 118 and smart speaker 120, generally being fixed devices, are coupled via wired connections to network 122 and communication interface 110, although in some embodiments both could also be coupled to network 122 via wireless connections. Laptop or desktop 118 can be any general-purpose computer commonly available from many manufacturers such as Apple, Dell, Lenovo, etc. Smart speaker 120 can also be a commercially available smart speaker, such as the Amazon echo with the Google home speaker.

As further discussed below, each of the devices that are communicatively coupled to cloud computing center 102 can run various functional modules that enable communication between each device and the cloud computing center 102, or between the devices themselves and/or their users. Smartphone 116, for instance, can include an application that runs one or more of the functional modules (see FIG. 5) to allow the smartphone to communicate with car 114, cloud computing center 102, etc. Laptop or desktop 118 can also run various of the functional modules, or can communicate via a web browser with cloud computing center 102, which can then run the appropriate modules to allow the laptop or desktop 118 to communicate with or interact with car 114, for instance.

Figure 2:
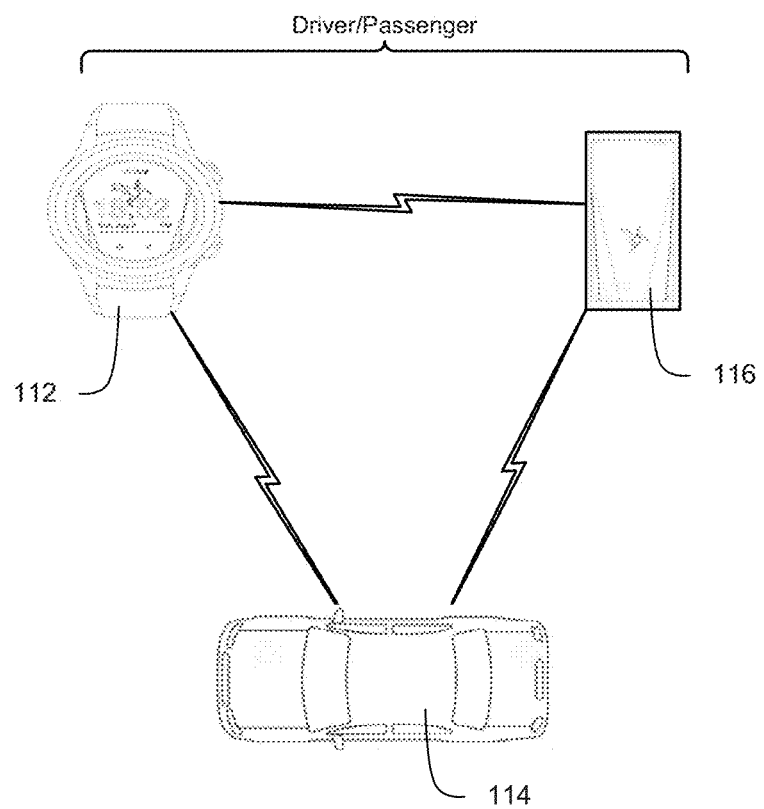
FIG. 2 is a block diagram of an embodiment of direct communication among elements of the platform of FIG. 1.

FIG. 2 illustrates an embodiment of direct communication between some of the devices of platform 100—in this embodiment the mobile devices including smart watch 112, smartphone 116, and vehicle 114. In various embodiments, smart watch 112 and smartphone 116 will be owned and carried by an occupant (i.e., the driver or passengers) of vehicle 114. In all instances these mobile devices can communicate with each other via the cloud computing center, but in some instances it might be useful for them to communicate with each other directly instead of through cloud computing center 102. Direct communication between the devices can be established via a variety of wireless protocols such as Wi-Fi, Bluetooth, etc. In some embodiments these direct wireless connections can be used to transfer data and/or instructions between the devices. But in other embodiments the direct wireless connection can be used for other purposes. Bluetooth, for instance, is a short-range communication protocol. If a Bluetooth pairing can be established between smart watch 112 and car 114, or between smartphone 116 and car 114, it can be inferred from the presence of the pairing that the paired device is in or near vehicle 114. Thus, the Bluetooth connection can be used not for data exchange but as a proximity sensor.

Figure 3A:
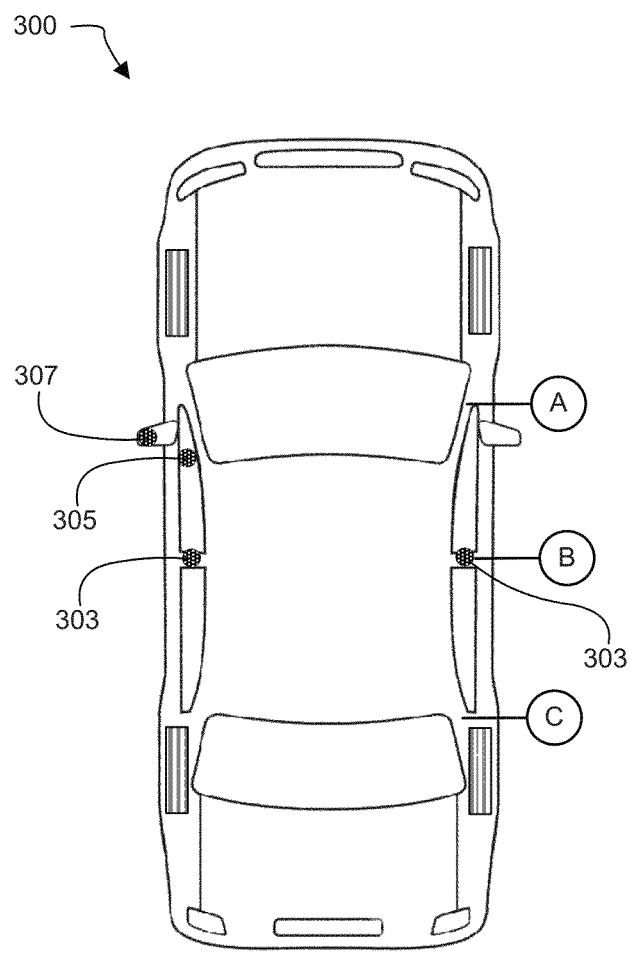
FIGS. 3A-3C are diagrams of an embodiment of a vehicle that is an element of the platform of FIG. 1.
Figure 3B:
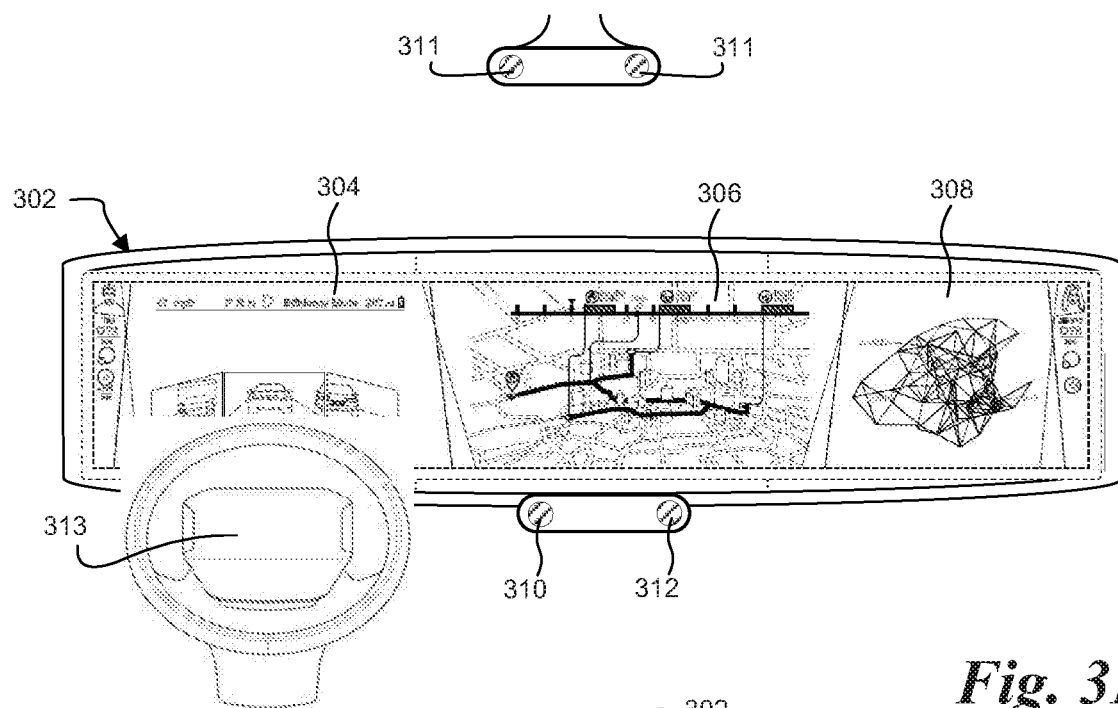
Figure 3C:
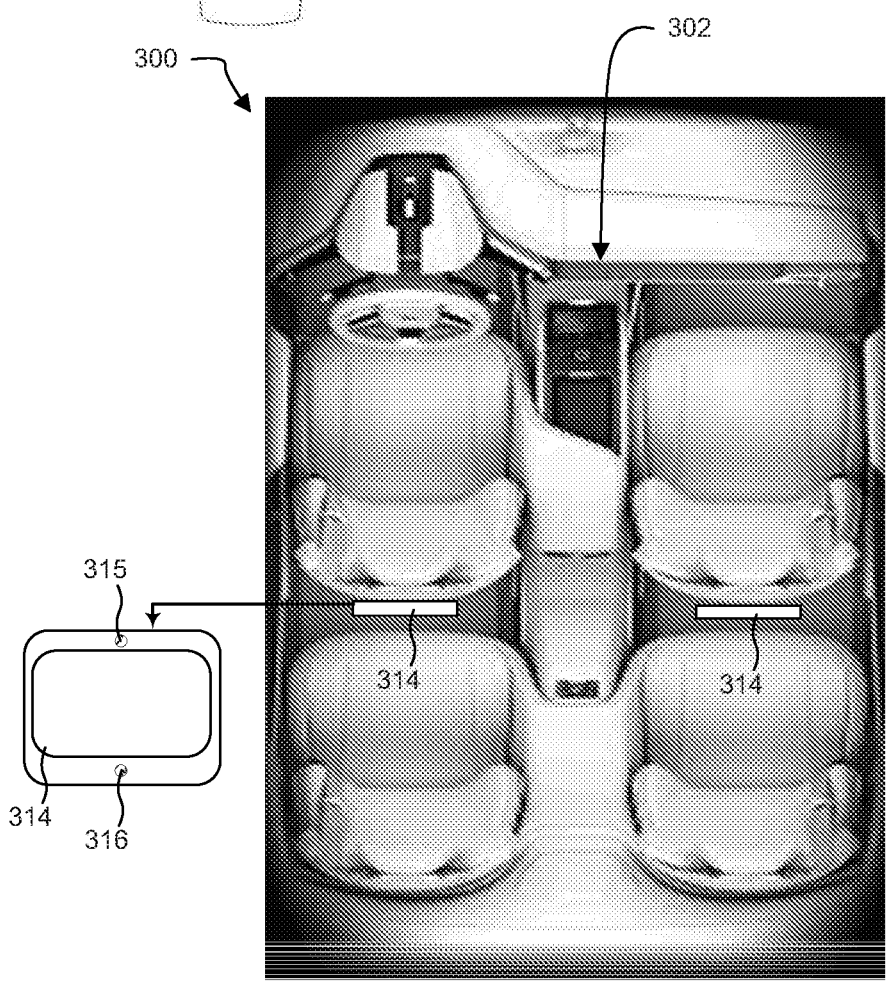

FIGS. 3A-3C illustrate embodiments of a vehicle 300 that can be used with platform 100. FIG. 3A illustrates an embodiment of the placement of user ID sensors on the exterior of a car 300. An automobile usually includes three pillars: an A pillar on the driver and passenger sides between the windshield and the front side windows; a B pillar on the driver and passenger sides between the front and rear side windows; and a C pillar on the passenger and driver sides between the rear side window and the rear window. In an embodiment, user ID sensors 303 are facial recognition cameras positioned on the B pillar on both the driver and passenger sides of the car to identify the driver and passengers before they enter the car. But in other embodiments cameras can be positioned differently. For instance, a facial recognition camera 305 can be placed in the car's interior pointing outward through the side window so as to capture an image of the driver's face. In yet another embodiment, a facial recognition camera 307 can be put on the driver's side mirror. In other embodiments other types of sensors can be used and can be positioned differently than shown. For example, in an embodiment using fingerprint recognition, fingerprint sensors could be put on the doors along the bottom of the windows.

FIG. 3B illustrates an automobile dashboard 302 which includes a plurality of displays. In the illustrated embodiment dashboard 302 includes a single display which can be configured to display different things in three software-configurable display regions 304, 306, and 308, but in other embodiments dashboard 302 can have a different number of display regions than shown and in still other embodiments regions 304, 306, and 308 can be physically separate displays. Dashboard 302 also includes hand gesture recognition cameras 310 and 312 positioned below display regions 304, 306, and 308, where they can capture video or images of a at least one of the driver's hands and both hands or a front passenger. Facial cameras 311 can also be positioned in the cabin, for instance where a rear-view mirror is or where it normally would be if not present, to capture video or still images of a driver and front passenger's faces. Cameras 311 can be used for facial recognition in embodiments that do not have external cameras as shown in FIG. 3A, or can be used for user input systems that support facial gesture or motion recognition. A display 313 can be positioned in the center of the steering wheel to act as a user input device and to provide additional display capabilities for the driver.

FIG. 3C is a plan view of an automobile interior 300. Automobile interior 300 includes dashboard 302 and also includes a driver's seat, a front passenger seat, and two rear passenger seats. As described above display regions 304, 306, and 308 in dashboard 302 provide displays for persons seated in the driver's seat and the front passenger seat. To provide displays for persons sitting in the rear passenger seats, rear passenger displays 314 can be positioned in the backs of the driver's seat and the front passenger seat. Each rear passenger display 314 includes a display unit on which information can be displayed for each passenger as well as a facial camera 315 to capture selfies or facial gestures and motions and a hand camera 316 to capture user input from each passenger, such as hand gestures and motions.

Figure 4:
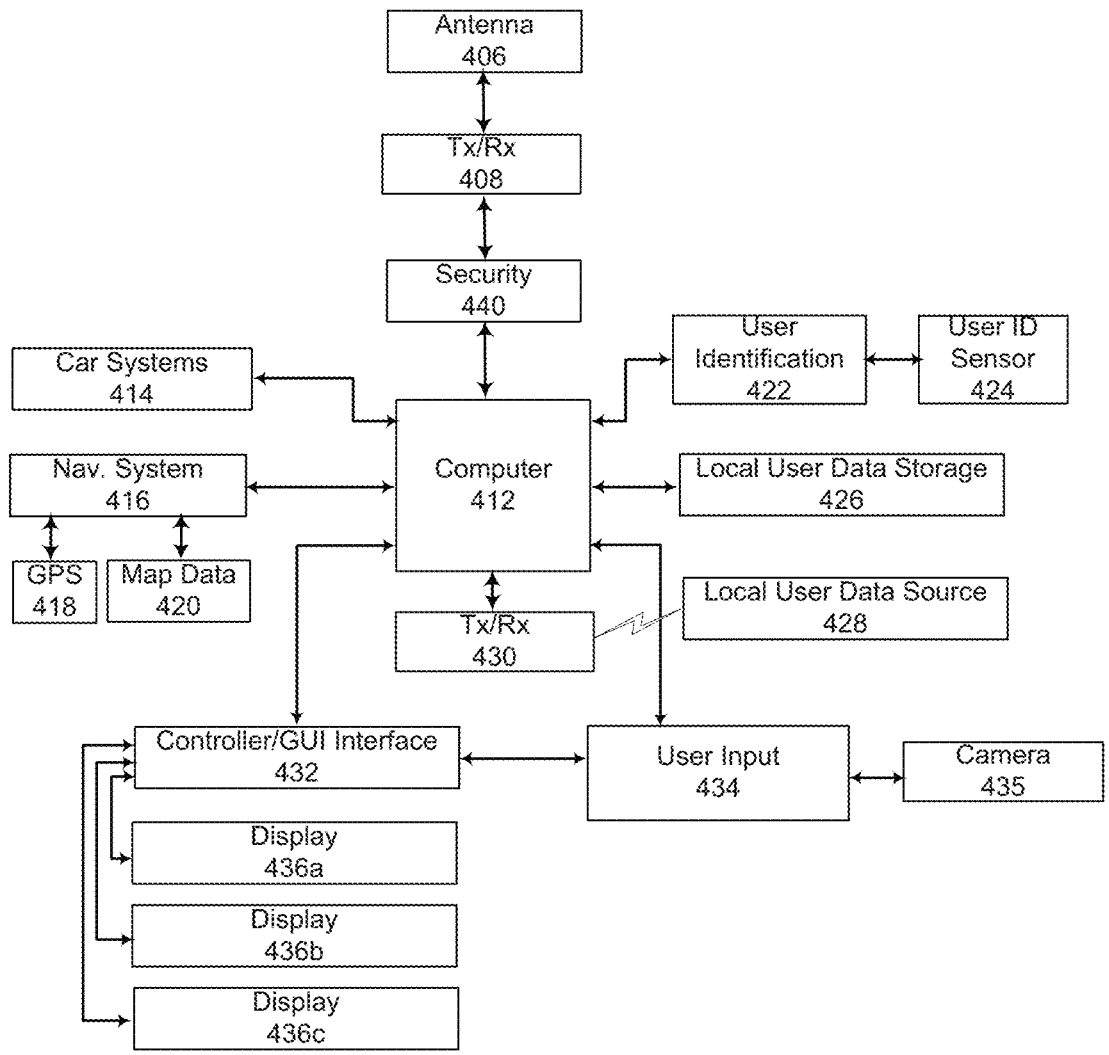
FIG. 4 is a block diagram of an embodiment of systems within a vehicle that forms part of the platform of FIG. 1.

FIG. 4 illustrates an embodiment of a system 400 that can be found within vehicle 114. Inside the car, a computer 412 is communicatively coupled to various elements including: a transceiver 408 via security gateway 440; car systems 414; a navigational system 416 that includes a position sensor or GPS 418 as well as a database including map data 420; a user identification system 422 coupled to one or more user ID sensors 424; a local user data storage 426 and a second transceiver 430 through which computer 142 can exchange data with a local user data source 428. A controller/graphic user interface (GUI) interface 432 is communicatively coupled to computer 142, and one or more displays 436a-436c are coupled to controller/GUI interface 432. A user input device 434, which can include at least one camera 435, is also communicatively coupled to computer 142.

Computer 142 is the hub of system 400. In the illustrated embodiment computer 142 is a programmable general-purpose computer that includes at least memory, one or more microprocessors, and storage. Other embodiments, however, can include one or more other types of computers, such as application specific integrated circuits (ASIC). Although represented as a single computer in the illustrated embodiment, in other embodiments computer 142 can include multiple processors or, in some embodiments, can comprise multiple separate computers that can communicate and coordinate with each other. In the illustrated embodiment the elements communicatively coupled to computer 142 are represented as components separate from the computer, but in other embodiments one or more of these other components can be implemented in software and run on the computer 142; in other words, in other embodiments one or more of the elements communicatively coupled to computer 142 can actually be processes running on computer 142.

Transceiver 408 is communicatively coupled via security gateway 440 to computer 142. Transceiver 408 is also coupled to antenna 406 to allow it to wirelessly exchange data with user account 404, for instance via Wi-Fi, cellular, or satellite communication. Security gateway 440 is communicatively coupled in the link between transceiver 408 and computer 142 to avoid downloading viruses, malicious code, or other data that could damage system 400 or, in particular, that could adversely influence car systems 414 and compromise vehicle safety. Security gateway 440 in one embodiment can be a computer running software such as anti-virus or anti-malware software User identification system 422 is coupled to one or more user ID sensors 424, and together they are used to identify users of system 400. In one embodiment user ID sensor 424 can include one or more facial recognition cameras, but in other embodiments other types of sensors such as biometric sensors (e.g., fingerprint or retinal scan) can be used. In still other embodiments, user identification system 422 can be the traditional username/password system in which a user enters their username and password via a keypad or other user input system. User ID sensors 424 can be positioned inside or outside the car (see, e.g., FIGS. 3A-3C) and used to identify the driver and/or passengers in the car.

Car systems 414 or coupled to computer 142 so that they can be controlled and/or adjusted by the driver or passengers of the car. Among other things, car systems 414 can include those that control the engine, steering, suspension, air-conditioning, interior lighting, exterior lighting, locking, and so on.

Navigation system 416 is coupled to computer 142 to provide navigation capability for the car. Among other things, navigation system 416 includes a position sensor such as a global positioning system (GPS) system 418, as well as a database that includes map data 420. Map data 420 can be commercially available map data obtained from map data sources such as Google, Bing (Microsoft), TomTom, Garvin, etc. Navigation system 416 uses GPS 418 to determine the current position of the car and uses map data 420 to show the current position of the car on a map, as well as the map locations of future events, on at least one of displays 436a-436c (see below).

Local user data storage 426 is coupled to computer 142 to locally store data retrieved from cloud computing center 102. The data stored in local user data storage 426 may be raw data obtained directly from a user's profile or can be data that has been further processed by computer 412 or computing center 102. Data stored in local user data storage 426 can then be used to personalize the vehicle, offer user suggestions, etc.

In some embodiments, rather than obtain user data from cloud computing center 102 it may be desirable to obtain the user data from a local user data source 428. In one embodiment, local user data source 428 can be a smartphone or smartwatch that the user carries with them in the car, as shown in FIG. 2. Local user data source 428 can have versions of the user's profile on it, so that all data available from cloud computing center 102 is also available from local user data source 428. In another embodiment, it could be necessary to use local user data source 428 if, for instance, a connection cannot be established between transceiver 408 and cloud computing center 102.

Transceiver 430 is coupled to computer 142 to access data from local user data source 428 and transfer it to local user data storage 426. Local user data source 428 can then communicate, wirelessly or by wire, with transceiver 430. Wireless communication between local user data source 428 and transceiver 430 can be accomplished, for instance, using short-range wireless protocols such as Bluetooth, but in other embodiments it can communicate using other wireless communication formats such as Wi-Fi.

Controller/graphic user interface (GUI) 432 is coupled to computer 142 and also coupled to at least one display. In the illustrated embodiment three displays 436a-436c are coupled to controller/GUI interface 432, but in other embodiments the number of displays coupled to the interface can be different than shown. Although illustrated and referred to as separate displays, displays 436a-436c can be different parts of a single display.

A user input system 434 serves as a user input device for users within the automobile to interact with the system 400. In one embodiment, user input system 434 is coupled to one or more cameras 435 so that user input can be through hand gesture or facial gesture recognition. In other embodiments other user input devices can be used, instead of or in addition to user input system 434, to perform the same functions and actions that can be performed with user input system 434.

User input system 434 is coupled to computer 412 and in some embodiments can be directly coupled to controller/GUI interface 432. The one or more cameras 435 coupled to user input system 434 can be located in various places within a car's cabin; for instance, in one embodiment that there can be cameras for the driver and every passenger. The one or more cameras 435 can capture gestures, motions, or gesture/motion combinations made by the driver and one or more of the passengers. In one embodiment the gestures and motions can be hand gestures and motions, but other embodiments can, instead of or in addition to hand gestures and motions, use facial gestures and motions. The gesture control essentially provides a remote touch pad. Examples of hand gestures that can be used are: the user zooms in with gestures by grabbing and pulling towards the user; moving the user hand up and down, and left and right, to move objects up and down, and left and right; and rotating objects such as the map with a scoop gesture.

Figure 5:
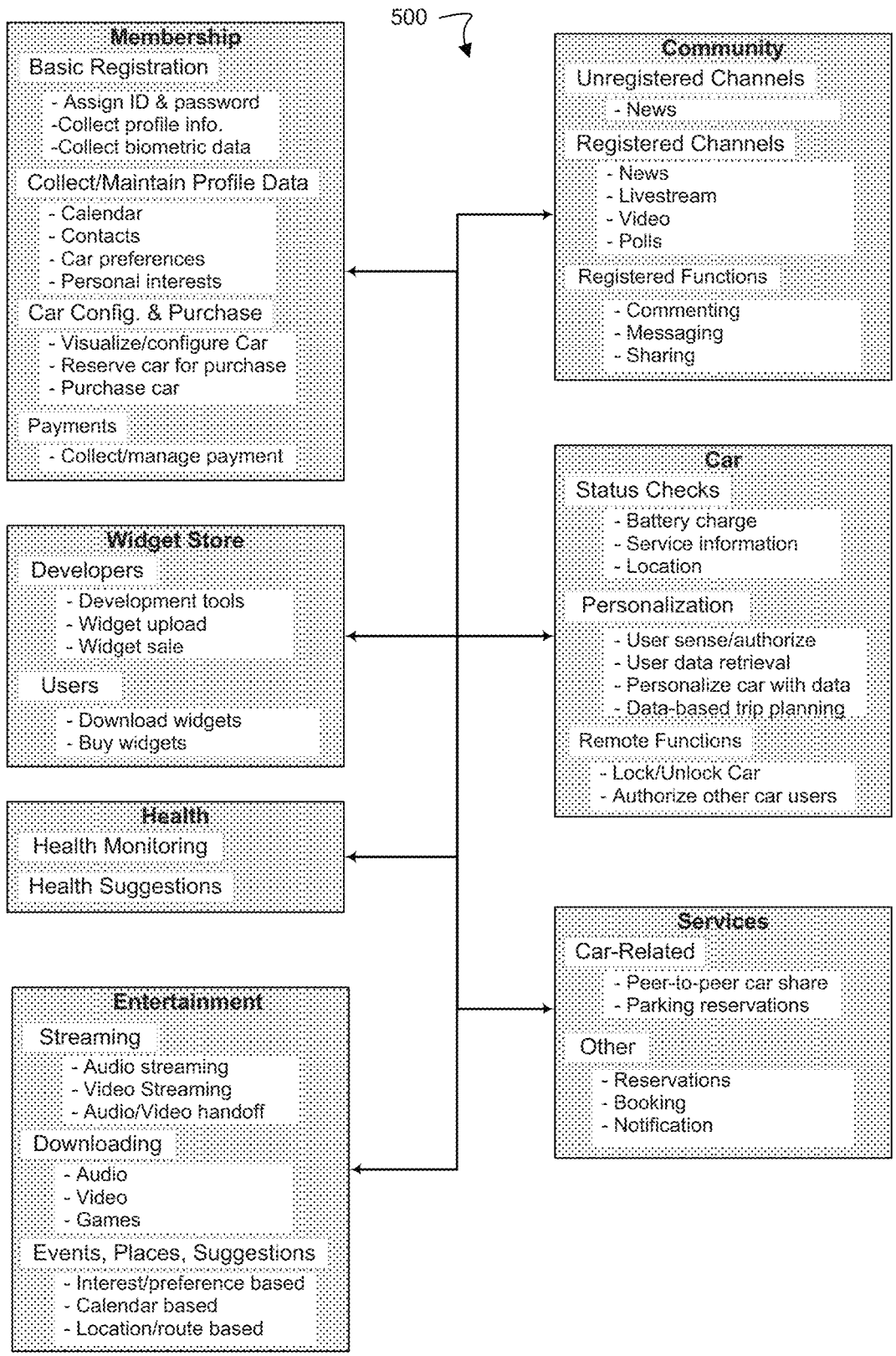
FIG. 5 is a block diagram of an embodiment of functional modules that can be run on and by one or more of the elements of the platform of FIG. 1.

FIG. 5 illustrates an embodiment of a set of functional modules 500 that can be used together with platform 100. The illustrated set includes seven modules, each of which executes one or more functions: a membership module, a community module, a widget store, a health module, an entertainment module, a car module, and a services module. Although illustrated as separate blocks, the different modules and their functions are not isolated and can interact with each other; any module, for instance, might call the membership module, or specific functions within the membership module, if a user using that module on their device wants to register with the platform. In other embodiments the functions can be grouped differently and the grouping of functions into particular modules need not be mutually exclusive—that is, just because a function is in one module doesn't mean that the same or a similar function cannot also be performed in or by another module.

In one embodiment, the functions in each module can be executed by a single device. But in other embodiments execution of the modules and/or their functions can be distributed among multiple different pieces of hardware. For instance, in any given module, one or more functions can be executed by the cloud computing center 102, by one or more of the devices coupled to the cloud computing center, by a combination of two or more devices, or by a combination of one or more devices and the cloud computing center. In one embodiment, execution of each function or each module can be assigned to the element whose computing power (processor speed, storage, etc.) is best suited to the requirements of the function.

The membership module handles functions related to registering users. In one embodiment, the membership module runs primarily on is run primarily by the cloud computing center 102, where most of the information collected by the membership module will be housed in a central location for distribution to and use by the other devices. Among other functions, the membership module can:

Enable multiple levels of membership in platform 100. The number of membership levels, and the qualifications for each level, can be different in different embodiments. For instance, in an embodiment used as an example throughout this description, the membership module can establish a four-level membership hierarchy as follows:
Membership level 0: unregistered users.
Membership level 1: registered users.
Membership level 2: registered users with a profile.
Membership level 3: registered users with a profile who have ordered or received a vehicle.

Handle basic user registration, including collecting basic user data, assigning IDs and passwords, collecting basic profile information Handle more advanced user registration functions such as collecting profile information including synchronizing data in a user's profile with data in applications found on a user's other devices such as a calendar, contact, personal interests, health, social media, etc., on a user's smartphone. User profiles that have been synchronized with other applications offer a rich source of user data that can be used by any module to offer suggestions based on current and/or historical profile data.

Allow a user to and purchase a car including visualizing and configuring the car, reserving the configured car for purchase, and completing purchase the car.

Handle payments for registered users, including payments for reserving or purchasing a car, and payments for services or entertainment selected through one of the other functional modules.

The widget store module offers developers and users the ability to add functions to functional modules. For the developer, the widget store gives them development tools with which to develop new widgets and allows them to upload and sell widgets they have developed to platform users. Users can download widgets from the widget store to each of their devices, thereby adding functionality to modules they already have on each device.

The health module uses sensors located in vehicle 114 to monitor and collect various health-related quantities of the occupants in a vehicle and send the collected data to cloud computing center 102. Based on the collected data, cloud computing center 102 can transmit health suggestions for the particular user to the health module running on whatever device a user is currently using.

The entertainment module provides user access to various pre-entertainment opportunities, such as:
Pre-Recorded Media:
　Audio or video streaming
　Audio/video handoff—that is, a mid-stream transfer of an audio or video stream from one device to another.
　Downloading of audio, video, and games.
Media that is Not Prerecorded, such as Movies, Plays, Live Musical Performances, Dining, etc.:
　Access, reservation, and booking of these events, working together with the services module.
　Recommendations based on factors such as interests and preferences, their, and location or anticipated route.

The community module offers users information in text, audio, video, or livestream form. The information can be presented in various channels, with access to particular channels depending on the user's membership level. For instance, unregistered users (membership level 0) might only have access to a channel that provides limited news in text or audio form, while for registered users (membership levels 1-3) the community module can provide expanded news and other premium content in text, video, audio, or livestream forms. In addition to providing information to users, the community module can also offer users the ability to interact with other devices, with the cloud computing center 102, with the operator of cloud computing center 102, or with other users is also connected to cloud computing center 102. For instance, the community module might offer:
commenting, whereby user can offer comments on a content presented in a channel.
Messaging, allowing users to communicate with the operator of cloud computing center 102 or with other users also connected to the cloud computing center 102.
sharing with multiple users, for instance sharing their thoughts in response to a particular item of information in one of the channels.

The car module offers users the ability to interact, remotely or directly, with vehicle 114. Where interaction with vehicle 114 is direct, the car module also offers personalization of the car for registered occupants. The level of interaction offered by the car module can depend on a user's membership level. For instance, unregistered users may be allowed no interaction with the car unless authorized on the fly by the car's owner. Registered users who do not own a car may nonetheless have permission from the owner of a particular car to use and/or interact with that car, including personalization of the car for a registered user with permission. Car owners can of course be offered the full level of remote and direct interaction with their own car, and they can also be authorized users of cars that do not belong to them. In various embodiments, the car module can offer functions such as, among other things:

Remote Interaction:
  Locking and unlocking the car.
  Authorizing one time car users, for instance by capturing their image with ID sensors on the car, so and sending that image to the car owner for approval.
  Checking the status of various car systems such as battery charge, service information, and location.
Direct Interaction:
  Sensing and authorization of registered vehicle users (i.e., passenger or driver).
  Retrieving user data from the profile of a registered user.
  Personalizing the car with the data from a user's profile, databased trip planning based on the user's vehicle settings, calendar, contacts, preferences, and interests stored in their profile.

The services module offers services to users. In different embodiments, the services offered can be car-related or non-car related and the module cannot additionally offer car-related or non-car related suggestions to the user. Examples include:

Car-Related:
  Peer-to-peer car sharing.
  Parking reservations.
  Suggestions regarding car-related functions. For instance, if a user is looking for parking reservations, the services module might suggest the cheapest parking nearest to the user's destination.
Non-Car Related:
  Reservations.
  Bookings (i.e., completion of reservations by paying a fee or deposit).
  Notification.
  Suggestions regarding non-car related functions. For instance, if a user is looking for a restaurant, the services module might suggest a restaurant near the user's current location, based on the preferences stored in the user's profile.

Figure 6:
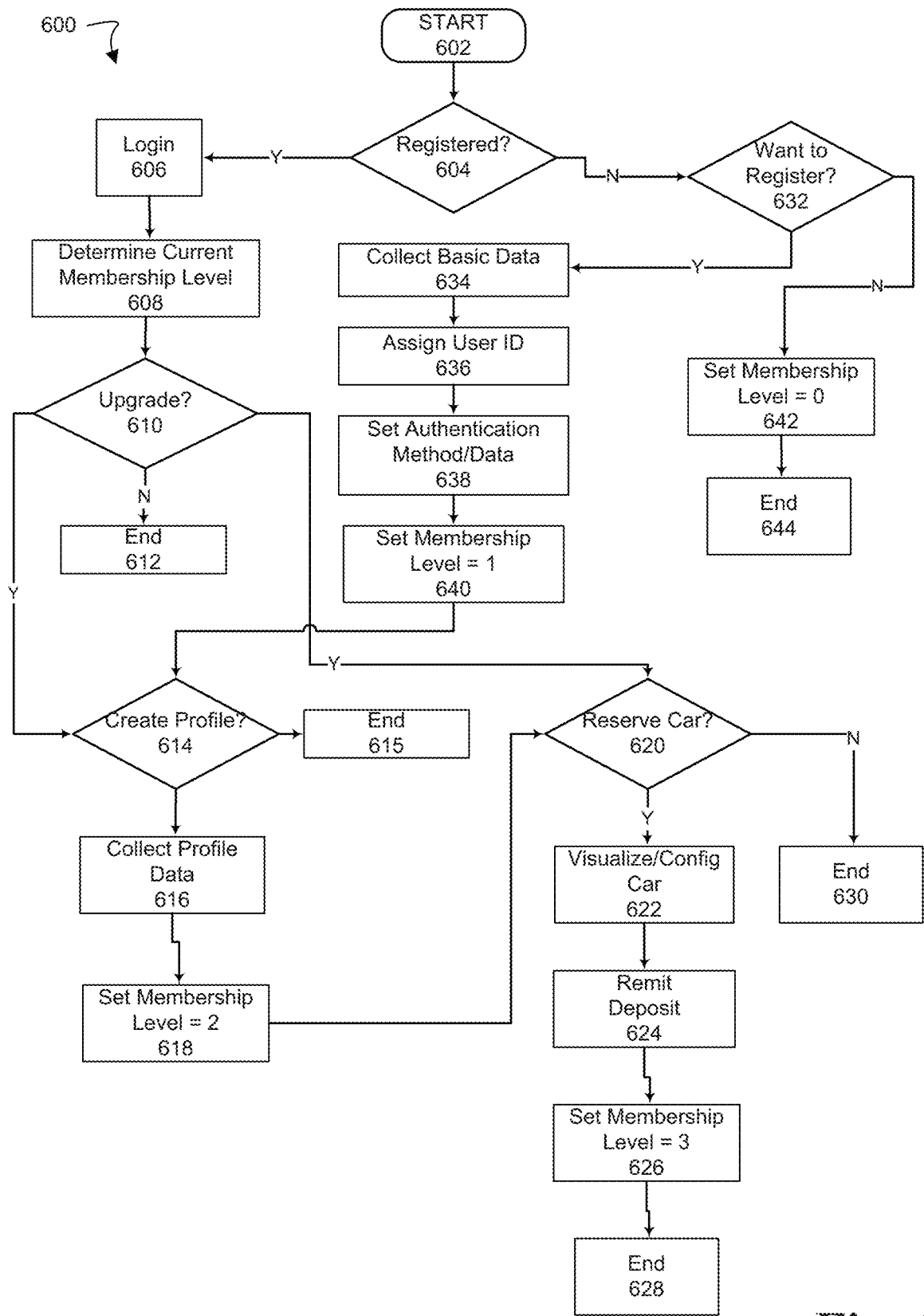
FIG. 6 is a flowchart of an embodiment of the membership module of FIG. 5.

FIG. 6 illustrates an embodiment of a process 600 that can be used by the membership module. The process starts at block 602. At block 604, the process checks whether a user is registered. If at block 604 the user is not registered, the process proceeds to block 632, where it queries whether the unregistered user wants to register. If at block 632 the unregistered user does not want to register, the process goes to block 642, where it sets the membership level to 0, and then ends at block 644.

If at block 632 the unregistered user wants to register, the process goes to block 634, where it collects basic user data. At block 636 the process assigns a user ID to the user, and at block 638 it sets the authentication method for the user and collects the required information. In an embodiment the user may want to use a password for authentication, in which case block 638 collects the user's selected password. In other embodiments the user might want to use a biometric authentication method such as facial recognition, retinal scan, fingerprint, etc.; that data can also be collected at block 638. Having finished at block 638, at block 640 the process sets the membership level to 1 and proceeds to block 614.

At block 614, the process queries whether the user, having registered, wants to create a profile. If at block 614 the user doesn't want to create a profile then the process ends at block 615. But if at block 614 the user wants to create a profile, the process goes to block 616 where it collects the profile data, for instance by data entry from the user or by accessing applications on the users of other devices—such as calendar, contacts, preferences, health, social media, etc. on the user's smartphone—to compile the user's profile. Having compiled the user profile, at block 616 the process goes to block 618 where it sets the membership level to 2.

From block 618 the process goes to block 620, where it queries whether the user whose profile has just been assembled wishes to reserve a car for purchase. If at block 620 the user does not wish to reserve a car, the process ends at block 630. But if at block 620 the user wants to reserve a car, the process goes to block 622 where the user can visualize and configure the car they would like. Having configured the car at block 622, the process goes to block 624 where the user remits a deposit on the car configured in block 622, and then goes to block 626 where it sets the membership level at 3. The process ends at block 628.

Figure 7B:
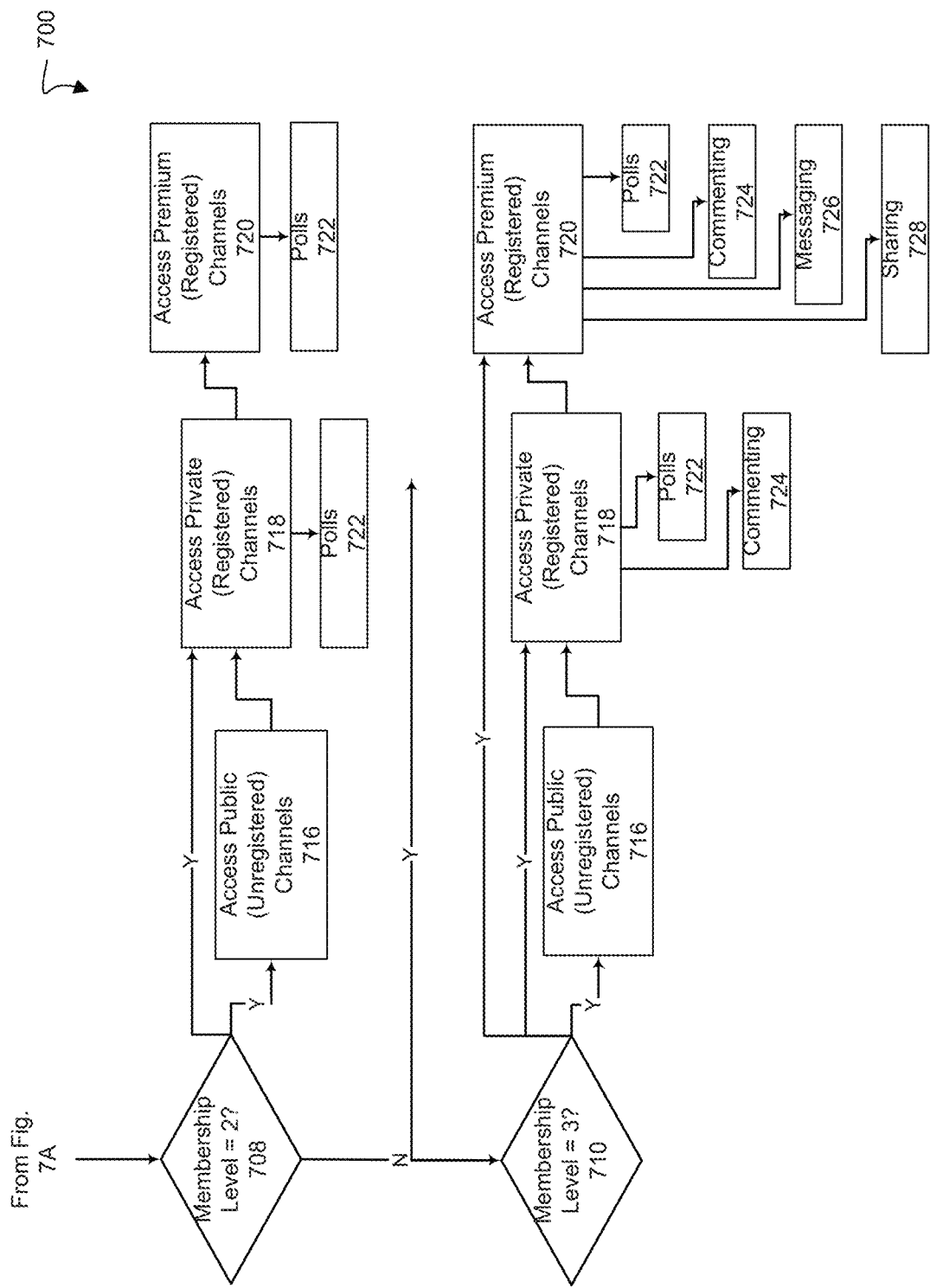

FIGS. 7A-7B together illustrate an embodiment of a process 700 that can be used by the community module. The process starts at block 701. At block 702 the process determines the membership level of the user and at block 704 queries whether the user's membership level is 0—i.e., whether the user is unregistered. If at block 704 the process determines that the membership level is 0, it proceeds to block 714 where it queries whether the user wants to register. If at block 714 the user does not want to register then the process goes to block 716, where the user is granted access to the public channels that are available to unregistered users. But if at block 714 the user wants to register the process goes to block 712 where the user can register, for instance by invoking the membership module process shown in FIG. 6. Although not shown, the registration/membership at block 712 can be accessed at any time to upgrade a membership.

After block 712, the process goes to block 702 and again determines the membership level of the user who, having registered, will now have a membership level greater than 0. The process proceeds again to block 704 and determines whether the membership level is equal to 0—that is, whether the user successfully registered. If the user successfully registered and their membership level is no longer equal to 0, the process proceeds to block 706 where it queries whether the user's membership level is 1—that is, whether the user has registered but has not created a profile. If at block 706 the user's membership level is 1 then the user has access to public channels 716 as well as to the first level of private (i.e., registered) channels 718. The user can access public channels 716 or private channels 718 directly or by first going through public channels 716.

If at block 706 the process determines that the user's membership level is not 1, then the process goes to block 708 where it queries whether the user's membership level is 2—i.e., whether the user has both registered and created a profile. If at block 708 the membership level is 2, the user is granted access to public channels 716, private channels 718, and premium channels 720. Premium channels 720 can be accessed directly or via public channels 716 and private channels 718 and, similarly, private channels 718 can be accessed directly or via public channels 716. With a membership level of 2, private channels 718 and premium channels 720 have the additional functionality of allowing the user to participate in polls 722, which can be accessed from their respective channel.

If at block 708 the process determines that the user's membership level is not 2, then the process goes to block 710 where it queries whether the user's membership level is 3—i.e., whether the user has registered, created a profile, and reserved or purchased a vehicle. If at block 710 the membership level is 3, the user is granted access to public channels 716, private channels 718, and premium channels 720. Premium channels 720 can be accessed directly or via public channels 716 and private channels 718 and, similarly, private channels 718 can be accessed directly or via public channels 716. With a membership level of 3, the private channels 718 and premium channels 720 have still more functionality, allowing the user to participate in polls 722, commenting 724, messaging 726, and sharing 728, all which can be accessed from their respective channel. Note that in other embodiments the additional functionality—polls, commenting, messaging, and sharing—can be allocated to the different channels in any combination. In another embodiment, for instance, both of private channels 718 and premium channels 720 may have access to all four functionalities for membership level 3 users. In yet another embodiment, private channels 718 may retain only polls 722 but not commenting 724, with commenting 724 being reserved for premium channels 720.

Figure 8:
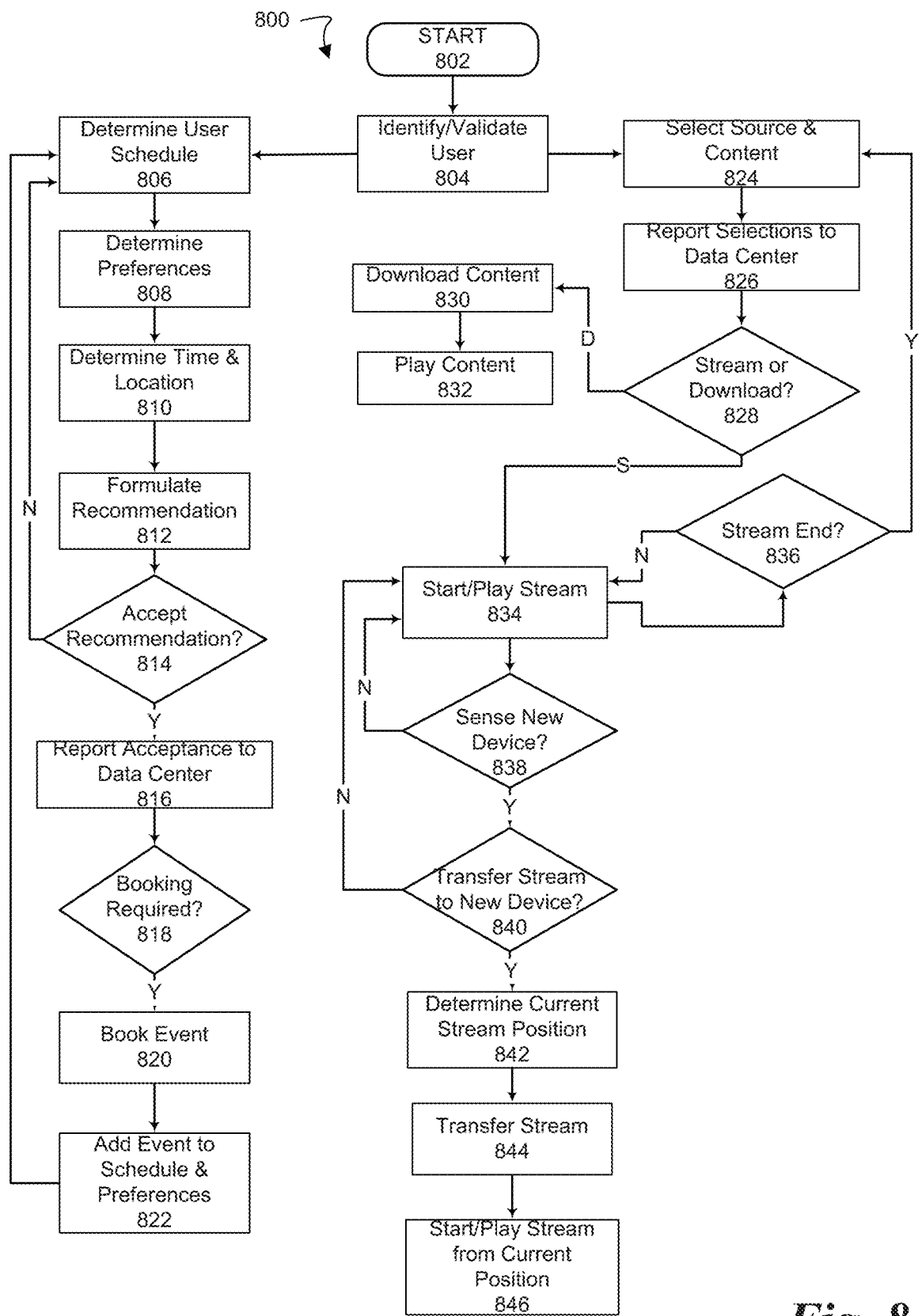
FIG. 8 is a flowchart of an embodiment of the entertainment module of FIG. 5.

FIG. 8 illustrates an embodiment of a process 800 that can be used by the entertainment module. The process begins at block 802 and proceeds to block 804, where it identifies and validates the user—that is, it identifies the user's membership level. Most of the functions in the entertainment module would require a membership level≥2, since they require a profile and might require payment. From block 804 there are 2 branches that can operate separately or simultaneously: the non-recorded entertainment branch, including blocks 806-822, and the recorded media branch, including blocks 824-846.

Taking the non-media entertainment branch first, from block 804 the process proceeds to block 806, where it determines the user's schedule, block 808 where it determines user preferences, and block 810 where it determines the current time and the user's current location. In one embodiment the information from blocks 806-808 is obtained by the cloud computing center 102 from the user's profile. Based on information collected at blocks 806-810, cloud computing center 102 formulates a recommendation and presents it to the user at block 812. For instance, based on the time and the user's current location and schedule, the process can recommend a nearby restaurant for dinner and/or a nearby movie or live performance.

At block 814 the user decides whether to accept the recommendation offered at block 812. If the user does not accept the recommendation the process returns to block 806, but if the user accepts the recommendation at block 814 the acceptance is reported to the cloud computing center at block 816 and at block 818 the process queries whether any booking is required to complete the recommendation. If at block 818 a booking is required, the process proceeds to block 820 where it books the event, for instance by calling the services module (see FIG. 9) and then proceeds to block 822 where it adds the event to the user's schedule and preferences, both located in the user's profile.

The recorded media branch of process 800 starts at block 824, where the user selects the source and the content of the recorded media they want to view or listen to. At block 826, the process reports the selection to the cloud computing center to the cloud computing center so that it can be noted in the user's profile. At block 828, the process queries whether the selected content is a stream or a download. If at block 828 the selected content is a download the process goes to block 830, where it downloads the content, and then to block 832 where it plays the content. If at block 828 the selected content is a stream, then the process goes to block 834 where it plays the streaming content. As the selected streaming content is played at block 834, at block 836 the process checks whether the stream has ended. If at block 836 the stream has ended, the process returns to block 824 so that the user can select new content, but if at block 836 the stream has not ended then the stream keeps playing at block 834.

From block 834, the process also goes to block 838, where it checks whether a new device has been sensed. This could happen, for instance, if a user begins streaming content on their mobile phone 116 but then gets in or near their vehicle 114. If at block 838 a new device is sensed, the process goes to block 840, where it queries whether the user wants to transfer the stream to the sensed device. If at block 840 the user does not want to transfer the stream to the new device the process returns to block 834, where it continues playing the stream. But if at block 840 the user wants to transfer the stream to the new device, the process moves to block 842 where it determines the current position in the stream, then goes to block 844 where it transfers the stream to the new device, then goes to block 846 where it plays the stream on the new device, starting from the current stream position recorded on the previous device.

Figure 9:
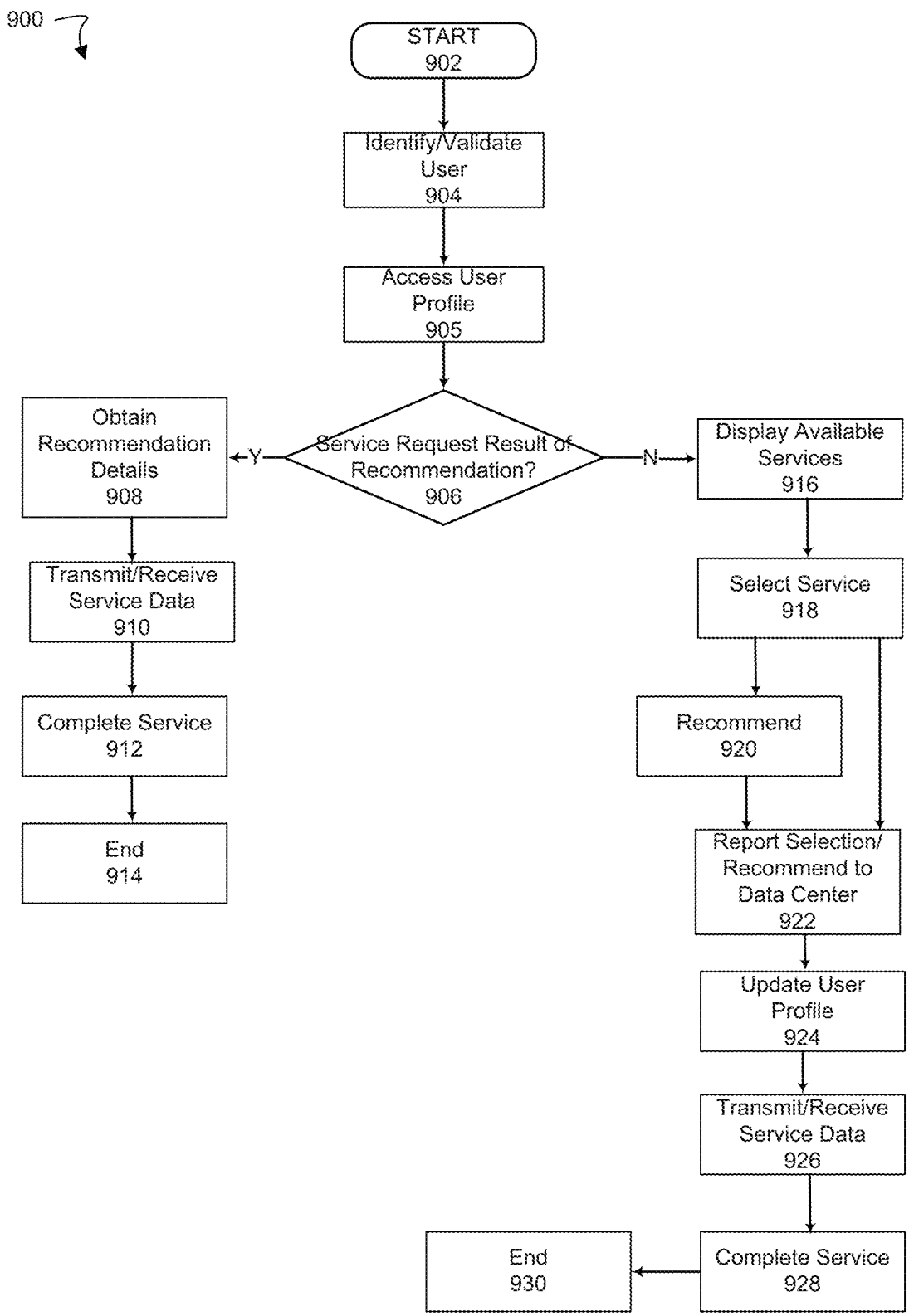
FIG. 9 is a flowchart of an embodiment of the services functional of FIG. 5.

FIG. 9 illustrates an embodiment of a process 900 that can be used by the services module. The process begins at block 902 and proceeds to block 904, where it identifies and validates the user—that is, it identifies the user's membership level. Most of the functions in the services module would require a membership level≥2, since most functions require a profile and might require payment.

At block 905, the process accesses the user profile and at block 906 determines whether the service request is the result of a recommendation from one of the other modules, such as the entertainment, car, or health modules. If at block 906 the service request is the result of a recommendation, the process goes to block 908, where it obtains the recommendation details, then proceeds to block 910 where transmits and and/or receives the service data. For instance, if the recommendation was for a particular restaurant, then at block 910 the process transmits the user's name and the reservation time to the recommended restaurant. A block 912, the process completes the service by providing any additional information, such as payment information if payment is required. For instance, if the recommendation was for a movie, block 912 sends payment information to pay for the movie tickets. The process then ends at block 914.

If at block 906 the process determines that the service request is not the result of a recommendation then it goes to block 916, where it displays available services for the user. A block 918 the user then selects the desired service. From block 918, the process can optionally go to block 920 where it makes a recommendation to the user based on the selected service; for instance, if at block 918 the selected service was a movie theater, at block 920 the process might recommend a particular movie and movie theater to the user based on their preferences, schedule, and current location. At block 922 the recommendation and/or selection are reported to cloud computing center 102, at block 924 the user's profile is updated to reflect the recommendation and selection, at block 926 the service data is transmitted (as in block 910), and it block 928 the services completed (as in block 912) and the process ends at block 930.

Figure 10:
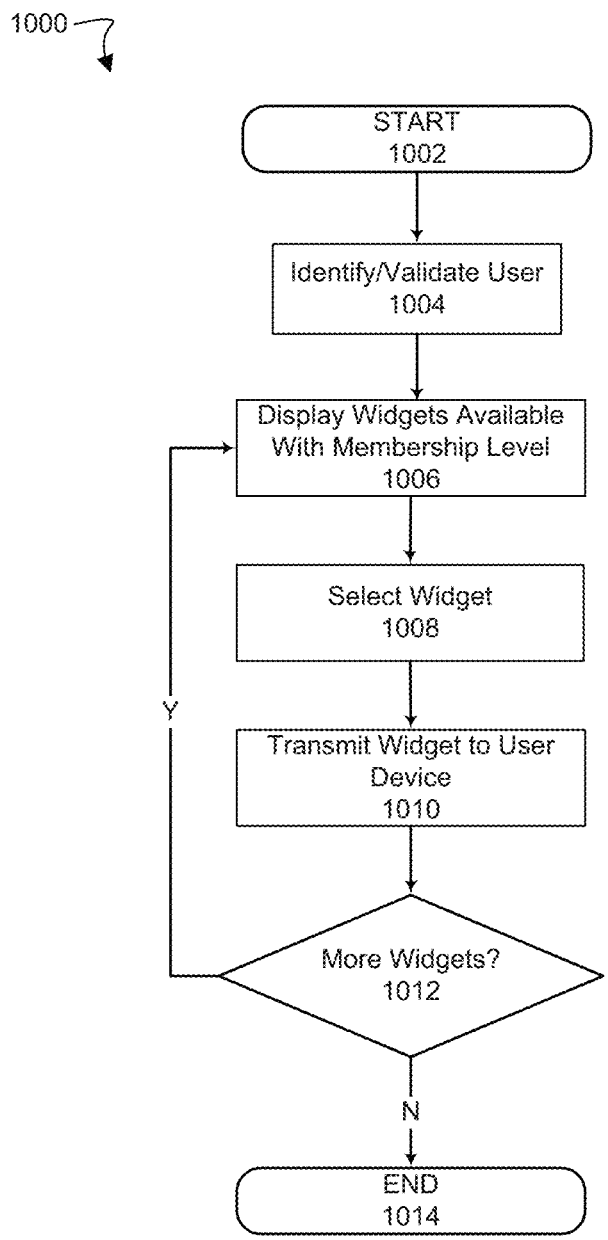
FIG. 10 is a flowchart of an embodiment of the widget store functional of FIG. 5.

FIG. 10 illustrates an embodiment of a process 1000 that can be used by the widgets module. The process starts at block 1002 and proceeds to block 1004, where it identifies and validates the user—that is, it identifies the user's membership level. At block 1006 the process displays for the user all the widgets available at their particular membership level. At block 1008 the user selects a widget and a block 1010 the selected which it is transmitted to the user's device. At block 1012, the process checks whether the user wants more widgets. If at block 1012 the user wants more widgets the process returns to block 1006, but if at block 1012 the user does not want any more widgets then the process ends at block 1014.

Figure 11:
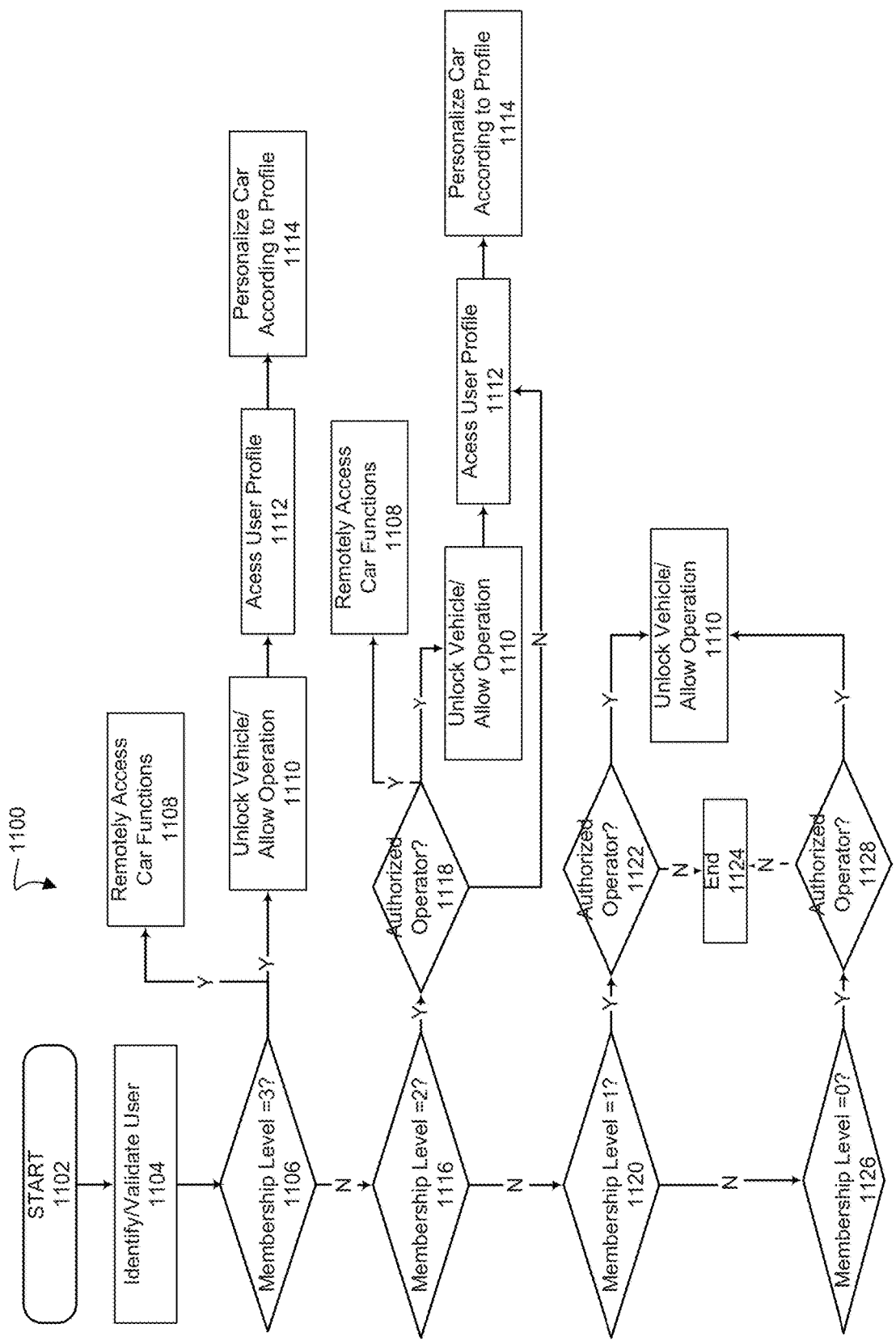
FIG. 11 is a flowchart of an embodiment of the car functions functional of FIG. 5.

FIG. 11 illustrates an embodiment of a process 1100 that can be used by the car module. The process starts at block 1102 and proceeds to block 1104, where it identifies and validates the user—that is, it identifies the user and their membership level. At block 1106 the process queries whether the user's membership level is 3—i.e., whether the user has registered, created a profile, and reserved or purchased a vehicle. If at block 1106 the process determines that the user's membership level is 3, then at block 1108 the user is given access to remote car functions, at block 1110 the user can unlock and operate the vehicle, at block 1112 can access the user's profile of and the vehicle can access the user's profile, and at block 1114 can personalize the car according to the user's profile. If the user is also the operator—that is, the driver—of the car, the personalization can include car settings such as seat positions mirror positions etc.

If at block 1106 the user's membership level is not 3, then the process goes to block 1116, where it queries whether the user's membership level is 2—i.e., whether the user has both registered and created a profile. If at block 1116 the membership level is 2, the process goes to block 1118 to check whether the user is an authorized operator of the vehicle. This can occur when the user is not the owner the car but has created a user account and a user profile and is authorized by the owner of the car to use the car—for instance, if one person in a family is the registered owner but other family members are allowed to drive the car. If at block 1118 the process determines that the user is an authorized operator, then the process goes to block 1108 where the user can remotely access car functions and also goes to block 1110 where the user can unlock and operate the vehicle. If at block 1118 the process determines that the user is not an authorized operator, the process goes to block 1112, where it accesses the user's profile and goes to block 1114, where it personalizes the car according to the profile. If the user is not an authorized operator, then the personalization of the car will take place at the display corresponding to the seat where that user is sitting in the car.

If at block 1116 the process determines that the user's membership level is not 2 it goes to block 1120, where it queries whether the user's membership level is 1—i.e., whether the user has registered but has not created a profile. If at block 1120 the process determines that the user's membership level is equal to 1, then it proceeds to block 1122 where it checks whether the user is authorized to operate the car. A registered user without a profile could nonetheless be an authorized operator of the car, although lack of a profile would prevent access to many features and personalization. If at block 1122 it determines that the user is authorized, then it proceeds it goes to block 1110 where it unlocks the vehicle and allows its operation by the user. Access to a user profile and personalization of the car are not possible at membership level 1 because the user has not set up a profile. If at block 1120 the user is not an authorized operator, then the process ends at block 1124.

If at block 1120 the process determines that the user's membership level is not 1, it goes to block 1126, where it queries whether the user's membership level is 0—i.e., whether the user is unregistered. If at block 1126 the process determines that the user's membership level is 0, then it proceeds to block 1128 where it checks whether the user is authorized to operate the car. An unregistered user could nonetheless be authorized to operator the car, for example by obtaining a one-time authorization from the car owner. In one embodiment, facial recognition cameras on the car could send an image of the user to the owner's smartphone, where the owner would then be given the option of allowing a one-time use of the vehicle by the user. If at block 1128 it determines that the user is authorized, then it goes to block 1110 where unlock the vehicle and allows its operation by the user.

Figure 12:
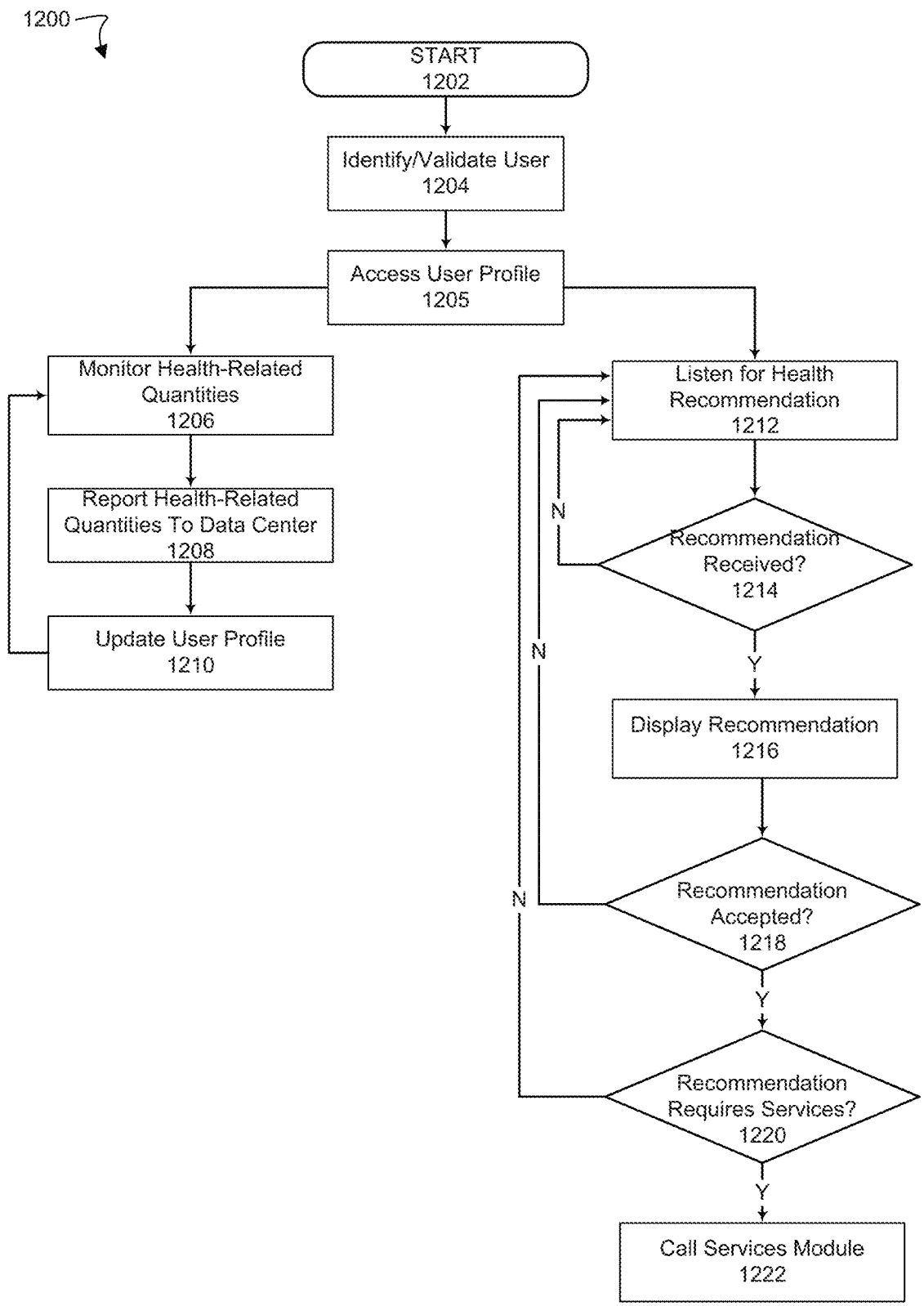
FIG. 12 is a flowchart of an embodiment of the health functional of FIG. 5.

FIG. 12 illustrates an embodiment of a process 1200 that can be used by the health module. The process begins at block 1202 and proceeds to block 1204, where it identifies and validates the user—that is, it identifies the user and their membership level. Most of the functions in the health module would require a membership level≥2, since they require a profile and might require payment.

At block 1205 the process accesses the user's profile and proceeds to block 1206 where it monitors health-related quantities using sensors in vehicle 114. At block 1208 the health-related quantities monitored at block 1206 are reported to the cloud computing center, and at block 1210 the cloud computing center updates the user profile.

Simultaneously with the monitoring and reporting of health-related quantities at blocks 1206-1210, at block 1212 the process listens for a health recommendation from the cloud computing center. Health recommendation can be based on the history of the health-related quantities monitored and blocks 1206-1210, as well as the user's preferences. For instance, if the monitor quantities indicate that the user could use some exercise and the current location the user's current location indicates that they are near a health club, the cloud computing center might recommend that the user stop into the health club. At block 1214 the process checks whether a recommendation has been received. If at block 1214 no recommendation has been received the process returns to block 1212, but if at block 1214 a recommendation has been received, the process goes to block 1216 where it displays the recommendation for the user, and goes to block 1218 where it checks whether the user has accepted the recommendation. If at block 1218 the user rejects the recommendation, the process returns the block 1212. But if at block 1218 the user accepts the recommendation, the process goes to block 1220, where it checks whether any services are required to carry out the recommendation, such as a reservation or payment. If at block 1220 no services are required to complete the recommendation, then the process returns to block 1212. But if at block 1220 services are required to complete the recommendation, then the process goes to block 1222 wherein can call the services module (see FIG. 9) to complete to invoke the services needed to complete the recommendation.

The above description of embodiments, including what is described in the abstract, is not intended to be exhaustive or to limit the invention to the described forms. Specific embodiments of, and examples for, the invention are described herein for illustrative purposes, but various equivalent modifications are possible within the scope of the invention in light of the above detailed description, as those skilled in the relevant art will recognize.

What is claimed is:

1. A system comprising:
a cloud computing center including one or more servers, storage coupled to the one or more servers, and a communication interface coupled to the one or more servers;
a plurality of devices communicatively coupled to the communication interface of the cloud computing center, wherein the plurality of devices can communicate with the cloud computing center and with each other via the cloud computing center, and wherein at least one of the plurality of devices is a vehicle;
a plurality of functional modules including instructions that, when executed by the cloud computing center, by at least one the plurality of devices, or by both the cloud computing center and at least one of the plurality of devices, enable functions including remote or direct interaction with the vehicle and, when there is direct interaction, personalization of the vehicle, wherein one of the plurality of functional modules is a module that:
transmits content to a first device of the plurality of devices,
upon detecting, during transmission of content to the first device, that a second device of the plurality of devices is near the first device, queries a user whether to transmit any remaining content to the second device instead of the first device, and
if in response to the query the user wants to transmit the remaining content to the second device, begins transmitting the remaining content to the second device instead of the first device,
wherein the vehicle is one of the first device or the second device.

2. The system of claim 1 wherein a subset of the plurality of devices can be communicatively coupled directly to each other.

3. The system of claim 1 wherein the plurality of devices include at least one of:
a mobile phone;
a smart watch;
a desktop or laptop computer; and
a smart speaker.

4. The system of claim 1 wherein the plurality of functional modules can interact with each other and further include at least one of:
a membership module to enroll members and manage profiles of enrolled members who choose to establish a profile;
a community module to provide information to users;
an entertainment module to provide audio or video media to a user and to suggest and arrange events for the user;
a widget store to allow the user to download widgets to add new functions to their devices;
a service module to provide services to the user;
a health module to monitor the user's health and provide health recommendations; and
a car module to allow owners or authorized users to interact with the vehicle, personalize the vehicle, or both.

5. The system of claim 4 wherein the functional modules can interact with each other.

6. The system of claim 5 wherein a user's access to the functional modules or to functions within each functional module depend on their membership level.

7. The system of claim 6 wherein the community module comprises a plurality of channels, each providing a different category of information, wherein each channel can provide at least one of text content, audio content, and video content, and wherein access to each channel depends on the user's membership level.

8. The system of claim 7 wherein the community module further comprises interactive features that allow users to interact with the cloud computing center, with the operator of the cloud computing center, or with other users, the interactive features including polling, commenting, messaging, and sharing.

9. The system of claim 8 wherein a user can add features to the community module on their device by adding widgets to one or more of their devices.

10. The system of claim 6 wherein the services module can suggest, perform, or both suggest and perform, car-related services and non-car related services, the car-related services including peer-to-peer car sharing and parking reservations and the non-car related services including reservations, booking, and notification.

11. The system of claim 6 wherein the entertainment module can suggest, perform, or both suggest and perform, media services and non-media services, the media services including audio or video streaming or downloading on one or more of the plurality of devices and the non-media services including live entertainment, media other than on one of the devices, and dining.

12. The system of claim 4 wherein the membership module establishes and recognizes multiple membership levels.

13. The system of claim 1 wherein remote interaction with the vehicle further includes at least one of:
checking the status of vehicle systems; and
checking the location of the vehicle.

14. The system of claim 1 wherein direct interaction with and personalization of the vehicle includes:
attempting to identify each occupant in the vehicle;
for occupants that can be identified, querying the cloud computing center to determine whether each identified occupant has a user profile;
for occupants that have a user profile, downloading their profile to a computer in the vehicle; and
executing relevant portions of each occupant's profile and interacting with each occupant through the display positioned where the occupant is sitting in the vehicle.

15. An apparatus comprising:
a vehicle having a computer, the computer including storage and at least one processor;
a transceiver communicatively coupled to the computer to allow the vehicle to communicate with a cloud computing center including one or more servers and storage coupled to the one or more servers and to communicate, via the cloud computing center, with a plurality of devices;
a plurality of functional modules including instructions that, when executed by the cloud computing center, by the computer, by at least one of the plurality of devices, or by all three, enable functions including remote or direct interaction with the vehicle and, when there is direct interaction, personalization of the vehicle, wherein one of the plurality of functional modules is a module that:
transmits content to a first device of the plurality of devices,
upon detecting, during transmission of content to the first device, that a second device of the plurality of devices is near the first device, queries a user whether to transmit any remaining content to the second device instead of the first device, and if in response to the query the user wants to transmit the remaining content to the second device, begins transmitting the remaining content to the second device instead of the first device,
wherein the vehicle is one of the first device or the second device.

16. The apparatus of claim 15, further comprising one or more identity sensors coupled to the computer to identify a driver or one or more passengers of the car.

17. The apparatus of claim 15, further comprising a user interface and a display for each seat in the vehicle.

18. The apparatus of claim 15 wherein a subset of the plurality of devices can be communicatively coupled directly to each other.

19. The apparatus of claim 15 wherein the plurality of devices include at least one of:
a mobile phone;
a smart watch;
a desktop or laptop computer; and
a smart speaker.

20. The apparatus of claim 15 wherein the plurality of functional modules can interact with each other and further include at least one of:
a membership module to enroll members and manage profiles of enrolled members who choose to establish a profile;
a community module to provide information to users;
an entertainment module to provide audio or video media to a user and to suggest and arrange events for the user;
a widget store to allow the user to download widgets to add new functions to their devices;
a service module to provide services to the user;
a health module to monitor the user's health and provide health recommendations; and
a car module to allow owners or authorized users to interact with the vehicle, personalize the vehicle, or both.

21. The apparatus of claim 20 wherein the functional modules can interact with each other.

22. The apparatus of claim 20 wherein the membership module establishes and recognizes multiple membership levels.

23. The apparatus of claim 22 wherein a user's access to the functional modules or to functions within each functional module depend on their membership level.

24. The apparatus of claim 23 wherein the community module comprises a plurality of channels, each providing a different category of information, wherein each channel can provide at least one of text content, audio content, and video content, and wherein access to each channel depends on the user's membership level.

25. The apparatus of claim 24 wherein the community module further comprises interactive features that allow users to interact with the cloud computing center, with the operator of the cloud computing center, or with other users, the interactive features including polling, commenting, messaging, and sharing.

26. The apparatus of claim 25 wherein a user can add features to the community module on their device by adding widgets to one or more of their devices.

27. The apparatus of claim 23 wherein the entertainment module can suggest, perform, or both suggest and perform, media services and non-media services, the media services including audio or video streaming or downloading on one or more of the plurality of devices and the non-media services including live entertainment, media other than on one of the devices, and dining.

28. The apparatus of claim 23 wherein the services module can suggest, perform, or both suggest and perform, car-related services and non-car related services, the car-related services including peer-to-peer car sharing and parking reservations and the non-car related services including reservations, booking, and notification.

29. The apparatus of claim 15 wherein remote interaction with the vehicle further includes at least one of:
checking the status of vehicle systems; and
checking the location of the vehicle.

30. The apparatus of claim 15 wherein direct interaction with and personalization of the vehicle includes:
attempting to identify each occupant in the vehicle;
for occupants that can be identified, querying the cloud computing center to determine whether each identified occupant has a user profile;
for occupants that have a user profile, downloading their profile to the storage coupled to the computer in the vehicle; and
executing relevant portions of each occupant's profile and interacting with each occupant through the display positioned at the seat where the occupant is sitting in the vehicle.

31. A process comprising:
communicatively coupling a plurality of devices to a cloud computing center, wherein:
the cloud computing center includes one or more servers, storage coupled to the one or more servers, and a communication interface coupled to the one or more servers, and
the plurality of devices can communicate with the cloud computing center and with each other via the cloud computing center and wherein at least one of the plurality of devices is a vehicle;
executing a plurality of functional modules including instructions that, when executed by the cloud computing center, by at least one the plurality of devices, or by both, enable functions including remote or direct interaction with the vehicle and, when there is direct interaction, personalization of the vehicle wherein one of the plurality of functional modules is a module that:
transmits content to a first device of the plurality of devices,
upon detecting, during transmission of content to the first device, that a second device of the plurality of devices is near the first device, queries a user whether to transmit any remaining content to the second device instead of the first device, and
if in response to the query the user wants to transmit the remaining content to the second device, begins transmitting the remaining content to the second device instead of the first device,
wherein the vehicle is one of the first device or the second device.

32. The process of claim 31 wherein a subset of the plurality of devices can be communicatively coupled directly to each other.

33. The process of claim 31 wherein the plurality of devices include at least one of:
a mobile phone;
a smart watch;
a desktop or laptop computer; and
a smart speaker.

34. The process of claim 31 wherein the plurality of functional modules can interact with each other and further include at least one of:

a membership module to enroll members and manage profiles of enrolled members who choose to establish a profile;

a community module to provide information to users;

an entertainment module to provide audio or video media to a user and to suggest and arrange events for the user;

a widget store to allow the user to download widgets to add new functions to their devices;

a service module to provide services to the user;

a health module to monitor the user's health and provide health recommendations; and a car module to allow owners or authorized users to interact with the vehicle, personalize the vehicle, or both.

35. The process of claim 34 wherein the functional modules can interact with each other.

36. The process of claim 34 wherein the membership module establishes and recognizes multiple membership levels.

37. The process of claim 36 wherein a user's access to the functional modules or to functions within each functional module depend on their membership level.

38. The process of claim 37 wherein the community module comprises a plurality of channels, each providing a different category of information, wherein each channel can provide at least one of text content, audio content, and video content, and wherein access to each channel depends on the user's membership level.

39. The process of claim 38 wherein the community module further comprises interactive features that allow users to interact with the cloud computing center, with the operator of the cloud computing center, or with other users, the interactive features including polling, commenting, messaging, and sharing.

40. The process of claim 39 wherein a user can add features to the community module on their device by adding widgets to one or more of their devices.

41. The process of claim 37 wherein the services module can suggest, perform, or both suggest and perform, car-related services and non-car related services, the car-related services including peer-to-peer car sharing and parking reservations and the non-car related services including reservations, booking, and notification.

42. The process of claim 41 wherein the services performed or suggested depend on the membership level of the user.

43. The process of claim 37 wherein the entertainment module can suggest, perform, or both suggest and perform, media services and non-media services, the media services including audio or video streaming or downloading on one or more of the plurality of devices and the non-media services including live entertainment, media other than on one of the devices, and dining.

44. The process of claim 31 wherein remote interaction with the vehicle further includes at least one of:
checking the status of vehicle systems; and
checking the location of the vehicle.

45. The process of claim 31 wherein direct interaction with and personalization of the vehicle includes:
attempting to identify each occupant in the vehicle;
for occupants that can be identified, querying the cloud computing center to determine whether each identified occupant has a user profile;
for occupants that have a user profile, downloading their profile to a computer in the vehicle;
executing relevant portions of each occupant's profile and interacting with each occupant through the display positioned where the occupant is sitting in the vehicle.

* * * * *